US005548903A

United States Patent [19]
Johnson et al.

[11] Patent Number: 5,548,903
[45] Date of Patent: Aug. 27, 1996

[54] WRENCH SELECTOR

[76] Inventors: George H. Johnson; Lillian D. Johnson, both of 398 NE. Camelot Dr., Port St. Lucie, Fla. 34983

[21] Appl. No.: 575,622

[22] Filed: Dec. 20, 1995

[51] Int. Cl.[6] .............................. G01B 3/20; G01B 5/02
[52] U.S. Cl. ............................................. 33/810; 33/679.1
[58] Field of Search ........................... 33/15 D, 700, 33/783, 806, 810, 811, 812, 501, 679.1

[56] References Cited

U.S. PATENT DOCUMENTS

| | | | |
|---|---|---|---|
| D. 319,404 | 8/1991 | Jackson, Sr. . | |
| D. 346,752 | 5/1994 | Krusling et al. . | |
| 1,238,045 | 8/1917 | Nelson | 33/812 |
| 1,287,040 | 12/1918 | Junker | 33/679.1 |
| 1,305,562 | 6/1919 | Paulsen | 33/679.1 |
| 1,700,857 | 2/1929 | Schultz . | |
| 2,034,804 | 3/1936 | Gamroth | 33/806 |
| 2,675,617 | 4/1954 | Goldman et al. | 33/811 |
| 2,928,182 | 3/1960 | Malczewski | 33/679.1 |
| 3,000,102 | 9/1961 | Snyder . | |
| 3,188,742 | 6/1965 | Pearl | 33/679.1 |
| 3,751,814 | 8/1973 | Crawford | 33/810 |
| 3,845,559 | 11/1974 | Offer . | |
| 4,375,722 | 3/1983 | Nishikata et al. . | |
| 4,635,370 | 1/1987 | Beaver | 33/679.1 |
| 4,677,751 | 7/1987 | Masseth | 33/679.1 |
| 4,730,399 | 3/1988 | Campbell | 33/810 |
| 4,745,685 | 5/1988 | Castillo | 33/679.1 |
| 5,345,636 | 9/1994 | Lamons . | |
| 5,390,427 | 2/1995 | Heller et al. | 33/811 |

FOREIGN PATENT DOCUMENTS

| | | | |
|---|---|---|---|
| 22771 | 11/1948 | Finland | 33/810 |
| 1089098 | 3/1955 | France . | |
| 311075 | 2/1919 | Germany . | |
| 632671 | 11/1949 | United Kingdom . | |

Primary Examiner—Thomas B. Will
Attorney, Agent, or Firm—Richard C. Litman

[57] ABSTRACT

A wrench selector provides for the quick and accurate checking of the dimension of a nut or bolt across the flats thereof, in order to determine the corresponding size of the wrench or socket required for use therewith. The selector incorporates two jaws, with the first jaw extending from an elongated scale and the opposite jaw extending from a body sleeve through which the scale slides. The scale includes several rows of dimensional numbers thereon, with each of the numbers corresponding to a distance between the two jaws. The numbers are staggered diagonally across the face of the scale, in order to spread them for greater legibility. The body or sleeve includes a set of windows spaced laterally thereacross, which in combination with the diagonal array of dimensional numbers, results in only a single one of the dimensional numbers being exactly aligned within a corresponding one of the windows for any measurement. The scale numbers correspond with the standard sizes of nuts and bolts used in industry, and the selector may include inch and fractional inch measurements on one side and metric measurements on the opposite side. The selector may be formed of various durable or disposable materials as desired, and may be made sufficiently small so as to fit within a conventional shirt pocket, in order to be readily available to the user at all times.

20 Claims, 5 Drawing Sheets

WRENCH SELECTOR

FIELD OF THE INVENTION

The present invention relates generally to gauges and related measuring instruments, and more specifically to a gauge providing for the accurate determination of the size of a nut or bolt of a standard size, and thus the corresponding selection of a mating wrench for use with the fastener. The present gauge provides for the exact determination only of one of the finite limited number of standard sizes of fasteners, rather than functioning as a vernier or other measuring instrument providing infinite readings. The gauge may include two different measurement systems (e.g., inch and metric) on opposite sides.

BACKGROUND OF THE INVENTION

Prior to the advent of the industrial age, standardization of tools and mechanical components was unknown. Prior to this standardization, workers were forced to spend considerable time selecting closely fitting components from a wide range of such components, having a practically infinite variation in size. Standardization of tools and gauges for use with such fasteners, was of course impossible.

With the automation of many manufacturing and assembly processes, the standardization of various components (e.g., nuts and bolts) as well as the tools used therewith, was developed in order to speed the process. The result is that the mechanic or craftsman may select an appropriately sized fastener and mating tool (wrench, etc.) for use with that fastener, relatively rapidly from a selection of a relatively few finite sizes.

While an experienced mechanic is generally able to judge the size of a fastener reasonably accurately by eye, and thus accurately select the appropriate wrench or socket for use with the fastener, this skill can be a difficult one to acquire and is not a perfect art, even for experienced workers. This often leads to some lost time, as the mechanic looks at e.g. a nine millimeter bolt head and erroneously picks up a ten millimeter socket to apply to the bolt. Each time such a minor "cut and try" error is made, the lost time may be practically insignificant, but the time lost to such minor errors can add up significantly in a major job.

This is all the more so, when the work project is remotely located from the mechanic's tools, resulting in the mechanic returning to his/her toolbox, selecting a wrench or socket, returning to the job site, finding the tool is the wrong size, returning to the tool box to try another size tool, etc. Such travels are exasperating to say the least, when a mechanic may be working under a vehicle, and the toolbox is located at the opposite end of the shop. As nuts and bolts are not marked with dimensions, the only solution is to try different tools until the proper tool is found, unless the fastener is accurately measured first.

Few mechanics take the time to measure such fasteners before selecting a tool, generally because the act of measuring the fastener is as inconvenient as erroneously selecting the wrong size tool and having to make a second selection. A standard linear ruler can be difficult to use due to parallax, a recessed fastener which is difficult to access, etc. While some have used calipers for such measurements, most calipers are vernier, and provide much finer measurement than needed for such a task. They are also delicate and prone to damage in such a harsh environment.

Accordingly, a need will be seen for a wrench selector providing for the quick and precise determination of the exact size of a nut or bolt comprising one of a family of standard sizes of fasteners. The selector must provide a positive and accurate indication of the exact size of the standard fastener, without requiring interpolation or other additional steps in the determination of the measurement or dimension. The device should provide for the determination of the size of fasteners of the two most common standards used, i.e., the English system of fractional inch and inch dimensions, and the metric system using millimeters. Finally, the device must be sufficiently small that it may easily be carried on the person (shirt pocket, etc.) in order to be available at all times so the user will not be forced to travel back to a tool bench or box to retrieve the device, as with an improperly sized tool.

DESCRIPTION OF THE PRIOR ART

U.S. Pat. No. 1,700,857 issued to Frank A. Schultz on Feb. 5, 1929 describes a Hem Gauge having a continuously graduated scale with an elongated slot down the center thereof. A slide with an index is installed within the slot. The device is used by placing the first end of the scale at the origin of the length or distance to be measured, and sliding the index to the appropriate measurement point. The length or distance is then read off the scale point aligned with the index, as with a conventional ruler or measurement scale. In contrast, the present gauge or selector provides for the precise determination of a relatively few incrementally standardized sizes of nuts and bolts or the like, and has no provision for an infinitely adjustable or readable scale.

U.S. Pat. No. 3,000,102 issued to Jack D. Snyder on Sep. 19, 1961 describes a Pipe Gauge somewhat similar to the Schultz gauge discussed immediately above. The Snyder gauge utilizes an L-shaped scale, with the longer portion having a continuous series of graduations thereon. The shorter portion forms a stop, which is disposed opposite a sliding index extension. The index includes a single window therein, which is disposed over some number or numbers depending upon the size of the pipe measured with the gauge by capturing the pipe between the stop and index extension. While the slide and extension include alignment lines thereon, they do not continue to the edge of the graduated area of the scale, due to the inset of the graduations from the scale edge. This can create some difficulty in obtaining an exact reading, particularly due to the closely spaced numerical graduations along the single scale and the corresponding single window used to view the appropriate reading.

U.S. Pat. No. 3,845,559 issued to Robert J. Offer on Nov. 5, 1974 describes a Filter Element Selector for use in determining the specific model of an automobile air filter by checking various filter dimensions with the selector. The device is similar to a T square, with an elongated scale extending from a fixed cross member. A complementary sliding member is installed on the scale, and moved to check various dimensions of a filter placed between the fixed and sliding members. Entire portions of several scales are simultaneously visible with the Offer device, unlike the present selector, and no window or other view limiting means is provided to narrow the field of view for ease of reading, as provided by the present selector. Due to the sizes of filters, the device is incapable of being stored in a pocket.

U.S. Pat. No. 4,375,722 issued to Goro Nishikata et al. on Mar. 8, 1983 describes a Vernier Caliper having a scale body formed of two parallel rods. The device functions in the manner of earlier known vernier calipers, but structural advantages are alleged with the Nishikata et al. caliper, due to the parallel rod body structure. A vernier provides for the reading of dimensions comprising an unbroken continuum of sizes, and includes a secondary vernier scale for finer readings. In contrast, the present wrench selector includes only a limited number of finite standard sizes of nut and bolt fastener dimensions, with a body portion having a plurality of windows therein, only one of which will precisely align with a single one of the standard dimensions provided on the slide, thereby providing an unambiguous readout of the size of the fastener and the corresponding wrench size required.

U.S. Pat. No. 4,677,751 issued to David A. Masseth on Jul. 7, 1987 describes a Device And Method For Determining Hose Size and Hose Fitting Style And Size. The device includes a slide portion through which an elongate scale passes. Cooperating internal and external indices are provided to opposite edges of one end of the device. A pair of viewing windows is provided through the slide portion of the device in order to view specific portions of the scale measurements, but the alignment of the windows and scales is such that several readings are viewed simultaneously, rather than only a single reading being precisely aligned in only one of the windows. Masseth requires such a simultaneous multiple readout, due to the many corresponding sizes and configurations of components which are used with hoses and pipes, unlike the present invention which is concerned strictly with nut or bolt fastener dimensions and the single corresponding mating wrench size.

U.S. Pat. No. 4,730,399 issued to Russ Campbell on Mar. 15, 1988 describes a Wheel Bolt Circle Gauge structurally somewhat resembling a vernier caliper. An elongated scale includes a tapered or conical tip, with a slide body having a single scale viewing window therein and a tapered or conical tip extending therefrom. The scale and corresponding opposite edges of the single window each include a different scale thereon, with one scale side and window edge providing a series of numbers corresponding to metric dimensions and the opposite side and edge having a set of numbers for inch dimensions. The use of a single window to view all of this information, results in a need for a separate table on the scale body for the interpretation of the numbers. The multiple window structure of the present gauge slide, permits the information to be obtained in a single operation with no requirement to check a secondary table or the like.

U.S. Pat. No. 4,745,685 issued to David D. Castillo on May 24, 1988 describes a Movable Jaw Measuring Apparatus, in which one edge of the jaw is aligned with one of a series of index marks provided on the body of the device when a bolt or nut is measured therein. All of the index marks and their corresponding numbers are visible simultaneously, unlike the multiple window configuration of the slide body of the present invention, which precludes viewing of the entirety of more than the single correct number at any one time. The long index mark leads required by Castillo in order to fit all the fractional numbers on the body of the device are somewhat confusing, and it would be easy to err by visually following an incorrect line to one of the numbers on the body and thereby secure the wrong wrench for the measured nut or bolt.

U.S. Pat. No. 5,345,636 issued to Danny E. Lamons on Sep. 13, 1994 describes a Multi-Tool Adjustable Wrench having a vernier scale on the adjustable wrench jaws. The limitations and disadvantages of a continuously reading and displaying vernier scale, as opposed to the discontinuous incremental markings provided with the present gauge and its multiple window configuration providing for the complete viewing and accurate alignment of only the single correct numerical readout at any one time, have been discussed further above. Moreover, the present gauge is not a wrench, and is not adapted to provide mechanical force or mechanical advantage to a fastener or the like, but only to measure the width of a nut or bolt head or the like to provide for the selection of an appropriately sized wrench or socket.

U.S. Pat. No. D-319,404 issued to Robert F. Jackson, Sr. on Aug. 27, 1991 describes a design for a Bolt Head And Nut Sizing Gauge. The device appears to have the general configuration of a conventional blade type feeler gauge, in that multiple blades are provided which pivotally fold from and into a housing. Each blade includes a plurality of different slots, each of which matches a differently sized nut or bolt head of standard dimensions. As no dimensional markings are indicated, it appears that the design is intended only for the sorting of mixed nuts and bolts into groups of identical sizes, with no concern being given to the determination of the specific sizes. Thus, the device cannot function as a wrench selector, as even after determining that a given fastener will fit precisely into a corresponding given slot of the Jackson, Sr. device, one still does not know the numerical dimension of the fastener and hence cannot match it up numerically with a dimensionally numbered socket or wrench.

U.S. Pat. No. D-346,752 issued to William A. Krusling et al. on May 10, 1994 describes a design for a Nut And Bolt Sizing Gauge, comprising a generally N-shaped flat plate. The tapered space on one side of the N shape includes a plurality of incremental segments apparently adapted to fit a nut or bolt head closely therein and corresponding to inch measurements, with the opposite side space being adapted for metric hardware. The device has no apparent adjustment, as most of the standard nut and bolt sizes are contained in the device in what is the equivalent of a large number of independent fixed jaws. In contrast, the present selector gauge has only two jaws, corresponding to inch and metric dimensions, with only a single dimensional number being completely visible and aligned for any one size of nut or bolt by means of the movable slide configuration of the present device.

German Patent Publication No. 311,075 to Georg Felsch and published on Feb. 27, 1919 describes a vernier caliper having slightly spread jaws. The jaws are incrementally marked from zero to five, and provide for the measurement of objects therebetween. The device appears to provide for relatively fine measurement of dimensions, in the manner of a vernier scale, but is easier to read due to the widely spread dimensional markings along the tapered jaws. The constant taper of the jaws, and infinite variation in dimensions of objects, obviously provides for measurements which do not always precisely correspond with any of the markings on the caliper jaws. Again, the present device, with its incremental markings corresponding precisely to the predetermined incremental dimensions of standardized sizes of nuts and bolts, and the viewing windows provided therewith, ensure that only one marking will be precisely aligned and completely readable at any one point.

British Patent Publication No. 632,671 to Hugo Nusshold and accepted on Nov. 28, 1949 describes A Vernier Calliper Gauge, which includes a micrometer therewith for even more accurate readings. However, the same disadvantages apply to the Nusshold instrument as to most others discussed above, in that the device is adapted for the measurement of practically infinite dimensional variations in a multitude of objects, with dimensions between the precise alignment of indicia on the scales, being subject to judgment and moreover being quite difficult to read accurately. The present invention is adapted for the reading of the dimensions of hardware which is available in a predetermined limited number of standard sizes, and accordingly need not include the complications of verniers and micrometers. The multiple window configuration, with only a single dimension precisely aligning in a single corresponding window, provides quick and accurate measurement at a glance with the present invention, for the desired function.

Finally, French Patent Publication No. 1,089,098 to Aircraft Marine Products, Inc. and published on Mar. 14, 1955 describes a wire cutting and stripping tool. A plurality of conventional wire stripping passages is provided between the handles, but the user must know the wire diameter in advance in order to select the proper passage, which will cut only the insulation without cutting the wire therein. The only gauge provided, is a series of circles having their diameters indicated. These cannot be used for the measurement across the flats of a polygonal nut or bolt. No windows displaying a measured dimension therethrough are disclosed.

None of the above noted patents, taken either singly or in combination, are seen to disclose the specific arrangement of concepts disclosed by the present invention.

SUMMARY OF THE INVENTION

By the present invention, an improved wrench selector is disclosed.

Accordingly, one of the objects of the present invention is to provide an improved wrench selector which is adapted for the determination of the sizes of nuts and bolts belonging to groups of predetermined standard sizes, for the selection of a corresponding mating wrench or socket for use therewith.

Another of the objects of the present invention is to provide an improved wrench selector which includes opposed jaws providing for the placement of a nut or bolt therebetween, with one jaw extending from an elongate scale and the opposite jaw extending from an index body or sleeve slidably secured to the scale portion.

Yet another of the objects of the present invention is to provide an improved wrench selector which elongate scale portion dimensional markings are diagonally staggered across the face of the scale in order to spread the indications for greater legibility, and which body or sleeve portion includes a plurality of windows disposed laterally thereacross, so that only one of the windows is exactly aligned with only one corresponding scale marking at any one time.

Still another of the objects of the present invention is to provide an improved wrench selector which may be similarly configured on opposite sides, thereby providing for the determination of hardware sizes of two different systems, such as the inch and fractional inch standard and the metric standard.

A further object of the present invention is to provide an improved wrench selector which may be formed of a variety of durable or disposable materials, as desired.

An additional object of the present invention is to provide an improved wrench selector which is sufficiently small in size as to fit within a conventional shirt pocket for ready availability.

A final object of the present invention is to provide an improved wrench selector for the purposes described which is inexpensive, dependable and fully effective in accomplishing its intended purpose.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters denote corresponding features consistently throughout the figures of the attached drawings.

DETAILED DESCRIPTION OF THE PREFERRED EMBODIMENT

Figure 1:
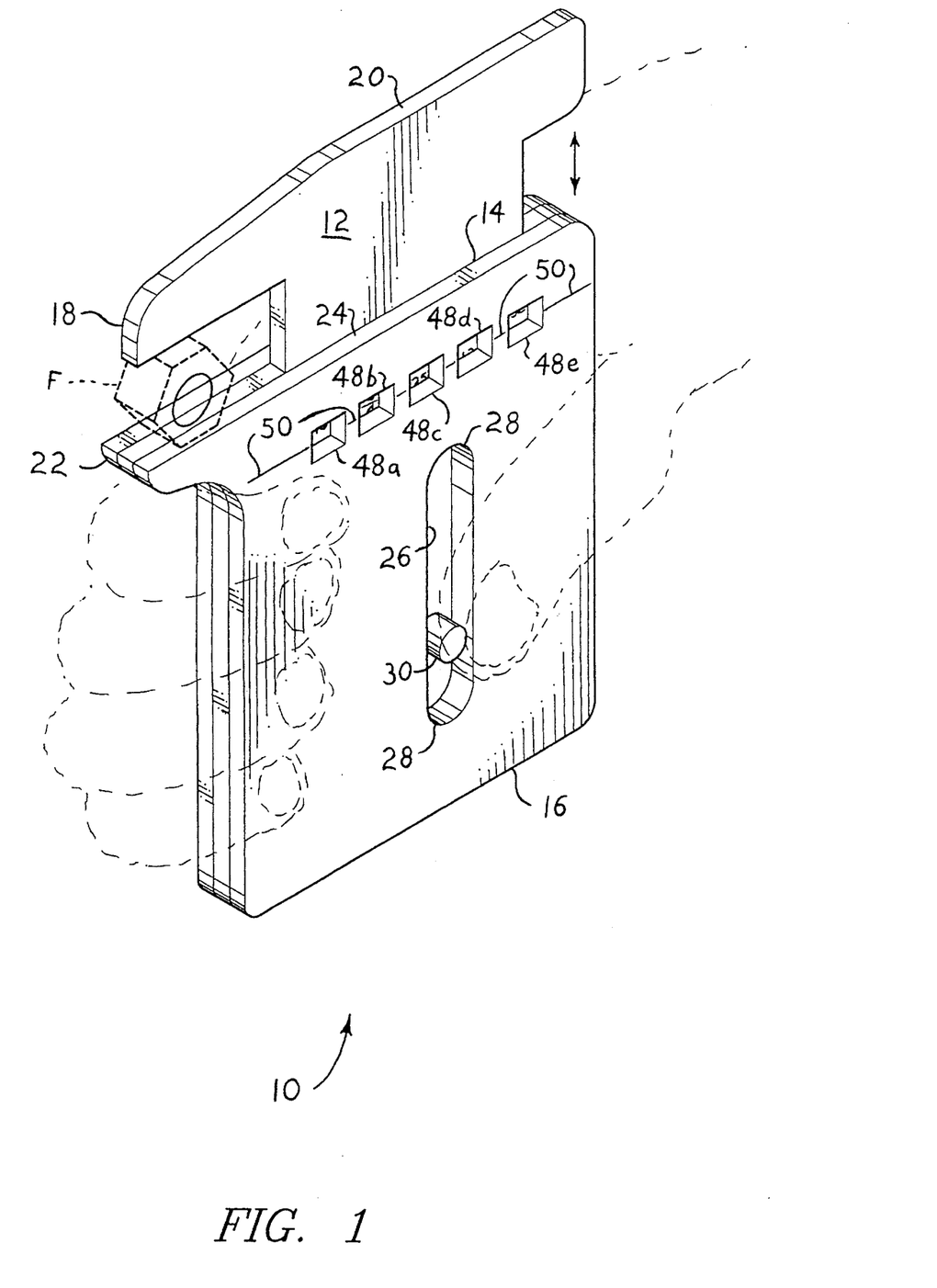
FIG. 1 is a perspective view of the present wrench selector in use, showing the fitting of a nut within the opposed jaws and the precise alignment of a single window index with a corresponding dimensional number of the scale to indicate the size of the nut.

Referring now particularly to FIG. 1 of the drawings, the present invention will be seen to relate to a wrench selector 10, which provides for the checking of the dimension across the opposite flats of a nut or bolt head from a group of such fasteners comprising a limited number of fasteners of standard sizes. In the U.S.A., two such standards are generally used: The fractional inch and inch series, and the metric series. Each of these series of standardized fastener dimensions comprises a limited, finite number of predetermined specific nut and bolt head dimensions, which increase incrementally from a smallest to a largest size. As only a limited number of specific sizes is provided in each series, a gauge or the like providing for the determination of the exact size of any given nut or bolt head, need include only a relatively small number of precise points, rather than providing for the measurement of a practically infinite number of infinitesimally small variations over a range of dimensions. As an example of the above, a gauge providing for the checking of fractional inch and inch series nuts and bolt heads, need only provide for forty different sizes, ranging from five thirty seconds of an inch to two and three eighths inches, in order to encompass all of the standard dimensions in that range, inclusive.

However, nuts and bolt heads typically are not marked with their dimensions across their opposite flats, thus requiring the craftsman or mechanic to estimate the dimension required for a corresponding wrench (box or open end, or socket, etc.) required to secure or remove the fastener in question. Either that, or the mechanic must measure the dimension, in order to be certain of securing the proper tool for use thereon.

Accordingly, the present wrench selector 10 includes a limited number of predetermined numerical indices, each corresponding exactly with a standard size of nut or bolt head of a group of different standard sizes. (The present selector 10 may provide for checking of both inch and metric sizes, with the indices for each series being placed on opposite sides of the selector 10.)

The wrench selector 10 generally comprises a flat, thin, wide, and elongated slide scale 12, which scale 12 is slidably installed in a slide scale slot 14 which passes through a flat, thin, and wide body sleeve 16. The scale 12 includes a first or slide scale jaw 18 extending laterally from the first end 20 thereof, which jaw 18 is disposed opposite a second or body sleeve jaw 22 extending laterally from the first end 24 of the body 16. The body sleeve 16 may include a slide scale retaining slot 26 having closed ends 28, through which a slide scale button 30 protrudes. The slide scale button enables a user of the present wrench selector 10 to slide the scale 12 relative to the body 16, by manipulating the button 30 in the slot 26. The slot 26 also serves to retain the slide 12 within the body sleeve 16, by means of the closed ends 28 of the slide scale retaining slot 26 precluding travel of the slide scale button 30 (and thus the slide 12 to which it is affixed) past those points relative to the sleeve 16.

Figure 2:
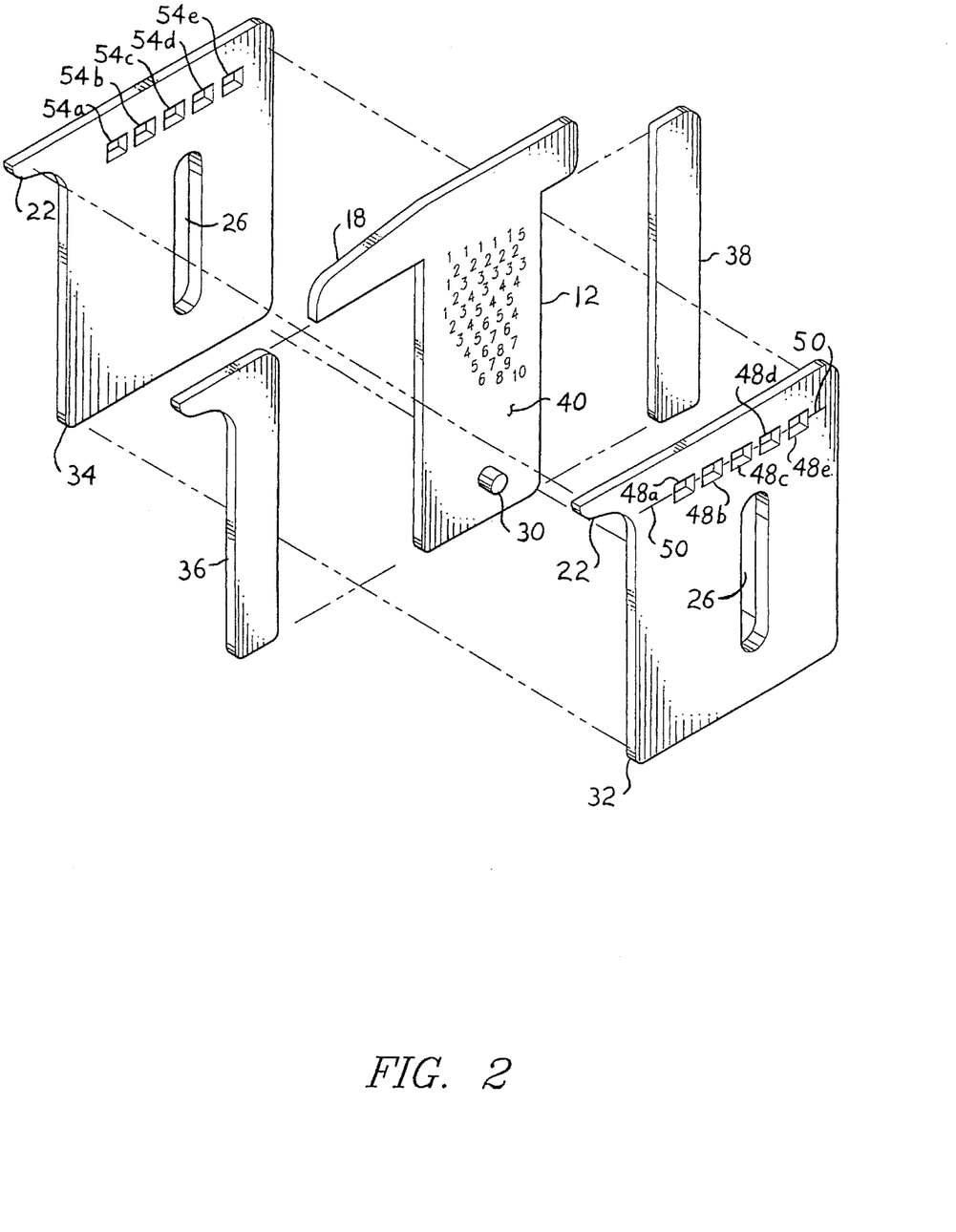
FIG. 2 is an exploded perspective view of the present wrench selector, showing the components thereof and their relationship.
Figure 5:
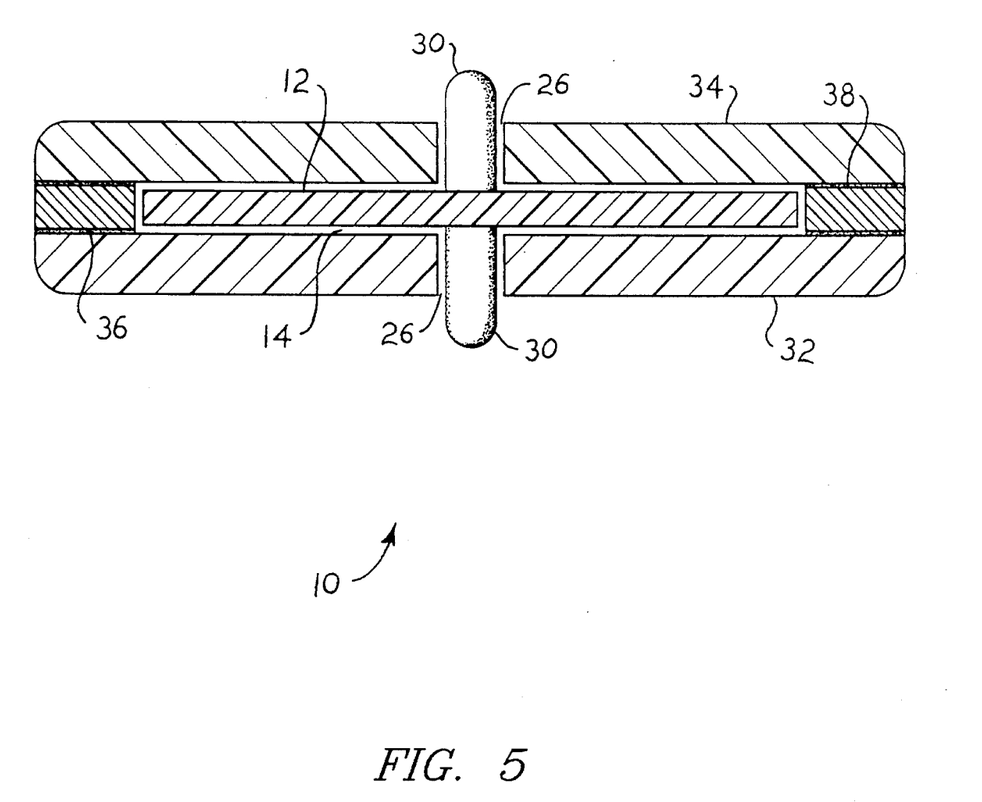
FIG. 5 is a cross sectional view through line 5—5 of FIG. 3, showing construction and assembly details.

FIGS. 2 and 5 provide a view of one means of construction of the present wrench selector 10. In those figures, the body sleeve is constructed of a first face 32 and an opposite second face 34. The two faces 32/34 are secured together by a first and an opposite second lateral spacer, respectively 36 and 38, sandwiched between the edges of the two faces 32/34. The two body faces 32/34, and the spacers 36/38, define the slot 14 for the slide scale 12.

Figure 3:
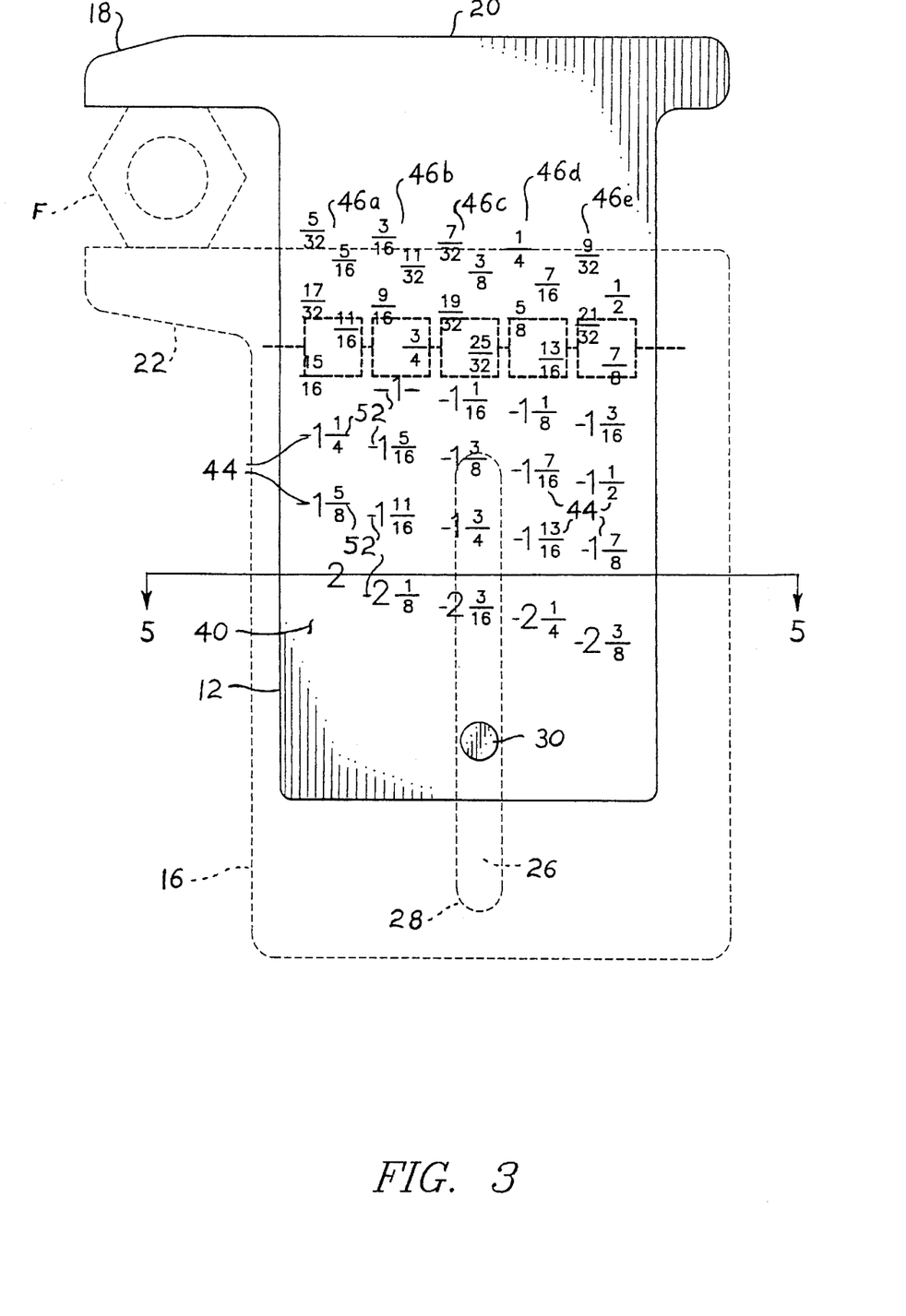
FIG. 3 is a front elevation view of one face of the elongated scale, showing the inch and fractional inch markings thereon, with the body sleeve portion shown in broken lines.
Figure 4:
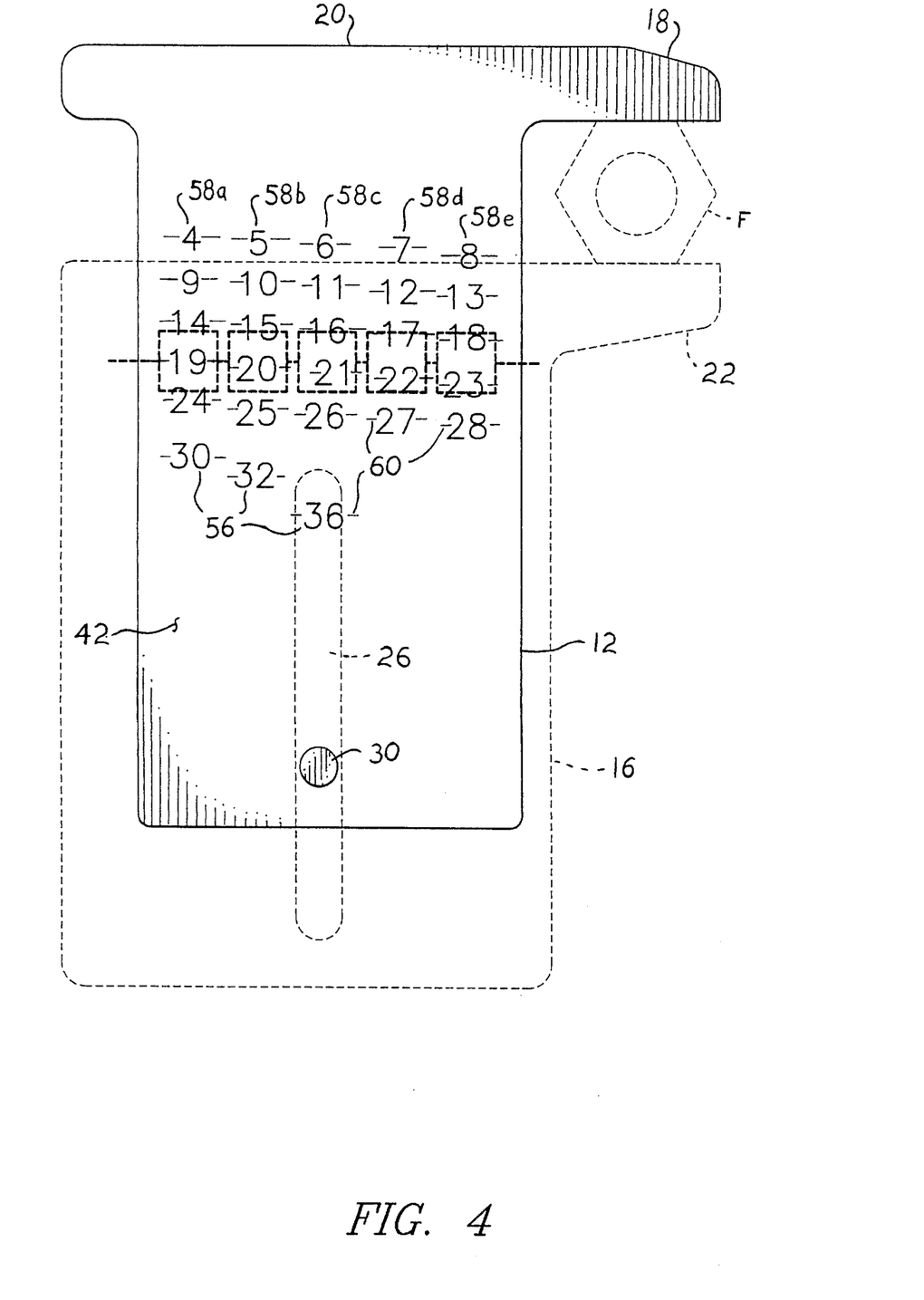
FIG. 4 is a rear elevation view of the elongated scale, showing the opposite face which is graduated in metric markings.

FIGS. 3 and 4 provide views respectively of the opposite first and second faces 40 and 42 of the slide scale 12. A series of fastener size numbers, generally designated as 44, is provided on the first face 40 of the slide scale 12, with the numbers 44 being in fractional inch and inch dimensions and corresponding to the dimensions across the flats of the nut and bolt heads comprising a set of standard fasteners, e. g., according to the Society of Automotive Engineers (S.A.E.), or other standard, as appropriate. As such standards include only a finite number of differently sized fasteners, the numbers 44 are arranged in a matrix of forty numbers, in order of their increasing size.

These numbers are arranged in a plurality of columns, e.g., columns 46a through 46e, for the five columns of numbers 44 shown in the present disclosure. (It will be seen that a larger or smaller number of columns may be provided, according to the size of the device, the number of fastener sizes which must be displayed, etc., as desired.) Each of the numbers 44 is positioned downward or away from the first end 20 of the slide scale 12 according to its value and the corresponding size of the fastener being checked. Thus, the first number at the top of the first column 46a, i.e., "5/32,", is positioned on the scale 12 to be clearly visible when the two jaws 18 and 22 are separated by five thirty seconds of an inch, as in checking a bolt head or nut having such a dimension across its flats. The next size up in the standard series is three sixteenths, or only one thirty second of an inch larger than the initial number. Accordingly, this number is placed only a thirty second of an inch farther down from the first end 20 of the scale 12. Other numbers are placed on the scale 12 a corresponding distance further from the end 20, according to their sizes.

The numbers 44 provided on the slide scale 12 will overlap and be illegible if they are of any appreciable size for ease of readability, assuming they are placed in a single vertical column, at least for the smaller sizes of fasteners in which their incremental size differences vary by only one thirty second of an inch. Accordingly, these numbers are spread among several columns, e. g., columns 46a through 46e, to "stagger" them laterally, as well as their being positioned vertically down the slide 12 in order of their increasing size. Thus, the second number in the series, i.e., "3/16," is only one thirty second of an inch further downward from the first number "5/32" of column 46a, but is spaced laterally therefrom to lie in the next adjacent column 46b. Thus, none of the numbers 44 will overlap one another, in spite of their having values quite close to one another. This results in a diagonally disposed matrix of numbers 44, with the numbers 44 progressing downwardly along the first face 40 of the slide 12, and also being displaced to the right one column, for each increment.

Returning to FIGS. 1 and 2, it will be noted that a series of windows, respectively indicated as 48a through 48e, is provided through each of the sides or faces 32 and 34 of the body 16. These windows 48a through 48e are placed laterally across each of the body faces 32/34, with the number of windows 48a through 48e corresponding exactly to the number of numerical columns 46a through 46e. With the numbers 44 being arranged generally diagonally, due to their incrementally increasing sizes and lateral spacing due to the columns 46a through 46e, and the windows 48a through 48e being positioned laterally, it will be seen that only a single number will be exactly positioned in any one of the windows at any specific positioning of the slide 12 in the body 16.

The present wrench selector 10 is used by placing a bolt head or a nut, designated as a fastener F, between the two jaws 18/22, and the jaws closed to contact the opposite flats of the fastener F. The size of the fastener F will appear precisely centered in only a single one of the windows 48a through 48e, as all of the other numbers will be at least slightly offset upwardly or downwardly in the other windows, due to their different spacing from the first or upper end 20 of the slide scale, according to the different fastener dimensions they represent.

FIG. 1 provides an example of the checking of a nut having a dimension of three quarters of an inch across a pair of opposite flats. It will be noted that, with the two jaws 18 and 22 closed upon the opposite flats, that the fractional dimension "3/4" of the second column 46b of the slide scale 12 (FIG. 3) is centered precisely in the corresponding second window 48b of the body sleeve 16. It will be noted that the next smaller dimension, i. e., "11/16" in the first column 46a to the left and slightly higher than the "3/4" dimension, is only partially visible in the corresponding first window 48a, and is not centered within that window 48a, thus indicating that it is not the correct dimension for the fastener F being checked. The next dimensional number to the right of the correct "3/4" number centered in the second window 48b, is the "25/32" number of the third column 46c. As this number is one thirty second of an inch farther down the scale 12 than the correctly positioned "3/4" centered in the second window 48b, the "25/32" will appear to be too low within the third window 48c, and thus should be disregarded. Other numbers will be shown only partially in other windows, in the same manner, with only a single correct number being exactly centered in a single window.

Additional precision may be achieved in the alignment of a given fractional number within one of the windows, by providing a window reference line 50, aligned with the center of the windows 48a through 48e and extending laterally across the body sleeve 16. Each of the numbers 44 may be provided with a lateral reference mark 52 thereacross, which marks 52 may comprise the fractional divisor between the numerator and denominator of the fractional number, or may comprise a lateral dash line to each side of a whole number. It is important to note that in any case, these marks 52 designate the exact dimensional reference point for the associated number 44, and that only a single lateral reference mark 52 will be precisely aligned with the window reference line 50. That single precisely aligned mark will indicate the single number which provides the proper indication of the size of the fastener being checked.

While the above description has been directed to a wrench selector 10 having fastener size indicators of only SAE standard fractional inch and inch dimensions, it will be noted that the flat and thin configuration of the present wrench selector allows the opposite second face 34 of the body sleeve 16 to be provided with a plurality of windows, i.e. windows 54a through 54e of FIG. 2, and the second face 42 of the slide scale 12 to be configured with a series of numbers 56 using a different fastener dimensional standard, e.g., the metric standard shown in FIG. 4. (It will be understood, however, that the configuration of the present wrench selector 10 may be adapted to use any series of incrementally increasing dimensional numbers of any standard, and is not limited to use with only inch and fractional inch standards and metric standards.)

The metric numbers 56 are arranged in the same manner as that described above for the fractional inch and inch numbers 44, with five columns 58a through 58e of metric numbers 56 being provided. Each successive numerical increment is spaced a correspondingly greater distance downward from the first end 20 of the slide scale 12, and each successive increment is placed laterally one column to the right of the previous number, resulting in a generally diagonal array for the downwardly and laterally displaced incrementally increasing numbers. The next larger number above a number in the fifth column 58e is placed in the first column 58a, beneath the previous number of that column, as in the case of the fractional inch and inch numbers 44 discussed above. This arrangement results in numbers in any given column being dimensionally separated by several increments, and thus providing space for such relatively widely separated numbers in a single column.

The metric standard numbers 56 are used in the same manner as that described above for the inch and fractional inch units, with a fastener being placed between the two jaws 18 and 22 of the selector 10, and the size of the fastener being displayed by the single number which is precisely centered within one of the windows 54a through 54e of the second face 34 of the body sleeve 16. As with the inch and fractional inch standard numbers 44 discussed above, greater precision may be obtained by providing a window reference line (not shown, but identical to the window reference line 50 of FIGS. 1 and 2) centered across the windows 54a through 54e, and a lateral reference mark 60 to each side of each of the metric standard dimensional numbers 56. The size of the fastener being checked will be indicated by the single metric number which is precisely centered in a single one of the windows 54a through e.

In summary, the present wrench selector serves as an extremely handy means of checking the size of a nut or bolt head to determine the corresponding size of the wrench or socket required for use with the fastener in question. Thus, the present selector serves to save a considerable amount of time and effort for the user of the device, by eliminating countless trips back and forth to a perhaps remotely located toolbox or workbench to secure wrenches and sockets to fit on a fastener on a trial and error basis.

Accordingly, the present selector is well adapted for carriage in a conventional shirt pocket of standard size, preferably having a generally rectangular configuration with a maximum width of no more than three inches and a maximum height of no more than five inches, including the protruding jaws. (A pocket clip, not shown, may be provided to better secure the selector within a pocket.) Preferably, the corners and edges of the selector are rounded, in order to preclude the scratching or marring of other surfaces, and/or damage to a shirt pocket or other portion of the apparel.

Preferably, the present selector is constructed of a durable metal, such as stainless steel or aluminum, with the numbers and reference lines being stamped, engraved, or otherwise permanently formed thereon, and all components having relatively tight tolerances and closely fitting together for maximum accuracy. However, the device also lends itself to use as a relatively inexpensive promotional article, and may be constructed of less expensive (and accordingly less durable) materials, if desired, such as plastic or even a stiff coated paper. While it is recognized that wrench selectors formed of such disposable materials would likely have a short life, they may be desirable for use as advertising "giveaways" or the like, in some circumstances.

It is to be understood that the present invention is not limited to the sole embodiment described above, but encompasses any and all embodiments within the scope of the following claims.

We claim:

1. A wrench selector adapted for the determination of the size of a threaded fastener of a group of fasteners having a limited number of different standard sizes and for selection of a correspondingly sized wrench for use therewith, said wrench selector comprising:

a flat, thin, wide, and elongated slide scale, said slide scale including a first end having a first jaw extending laterally therefrom and a first face having a plurality of fastener size numbers disposed substantially diagonally thereacross to form a plurality of vertical columns and a plurality of diagonal rows of fastener size numbers thereon, with each of said numbers corresponding to a standard fastener size, and;

a flat, thin, and wide body sleeve including a slot extending therethrough adapted to fit closely about said slide scale, said sleeve having a first end with a second jaw extending therefrom and opposite said first jaw of said slide scale, and a first face having a plurality of windows therethrough in a lateral array, with each of said windows being aligned with a corresponding one of said vertical columns of said fastener size numbers when said slide is placed within said slot of said body sleeve, whereby;

said first jaw and said second jaw are closed about each side of a fastener placed therebetween by sliding said slide scale within said slot of said body sleeve, and the size of the fastener is read within the single one of said windows having an exact alignment with a corresponding single one of said fastener size numbers, thereby providing an unambiguous readout of the size of the fastener and the corresponding wrench size required.

2. The wrench selector of claim 1, wherein:

each of said fastener size numbers disposed upon said scale includes a lateral fastener size number reference mark disposed at least to each side thereof, and said body sleeve includes a window reference line laterally disposed across said sleeve and centered across said lateral array of windows, with the precise alignment of said window reference line with a single one of said lateral fastener size number reference marks providing an exact indication of the size of a fastener placed closely between said first jaw and said second jaw.

3. The wrench selector of claim 1, including:

slide actuating and scale retaining means, comprising a closed end scale retaining slot formed through at least said first face of said body sleeve and parallel to said slide scale slot, and at least one slide button extending from said slide scale and through said scale retaining slot and captured therein, with said slide scale precluded from separation from said body sleeve by means of said slide button engaging each said closed end of said scale retaining slot to limit slide scale movement therethrough.

4. The wrench selector of claim 1, wherein:

said body sleeve is formed of a first face, an opposite second face spaced apart therefrom, a first lateral spacer, and an opposite second lateral spacer spaced apart from said first lateral spacer, with each said spacer being sandwiched between each said face, and with said slide scale slot being defined by said spaced apart first face and second face and said spaced apart first and second lateral spacer.

5. The wrench selector of claim 1, wherein:

said slide scale and said body sleeve are each formed having a generally rectangular configuration, with each said jaw, said slide scale, and said body sleeve each having smoothly rounded corners thereon.

6. The wrench selector of claim 1, wherein:

said fastener size numbers disposed upon said slide scale are each spaced downwardly from said first jaw a dimensional distance corresponding to each of said numbers, with said numbers comprising fractional inch and inch measurements.

7. The wrench selector of claim 1, wherein:

said fastener size numbers disposed upon said slide scale are each spaced downwardly from said first jaw a dimensional distance corresponding to each of said numbers, with said numbers comprising metric measurements.

8. The wrench selector of claim 1, wherein:

said slide scale includes five said vertical columns of said fastener size numbers, and said body sleeve includes five windows disposed laterally thereacross, with each of said windows being aligned with a corresponding one of said vertical columns of fastener size numbers when said slide scale is slidingly placed within said slide scale slot of said body sleeve.

9. The wrench selector of claim 1, wherein:

said wrench selector has a maximum width of three inches and a maximum height of five inches and is adapted to fit within a conventional shirt pocket.

10. The wrench selector of claim 1, wherein:

said wrench selector is formed of durable materials selected from the group consisting of stainless steel and aluminum metals.

11. The wrench selector of claim 1, wherein:

said wrench selector is formed of disposable materials selected from the group consisting of plastic and stiff coated paper.

12. A wrench selector adapted for the determination of the size of a threaded fastener of a group of fasteners having a limited number of different standard sizes and for selection of a correspondingly sized wrench for use therewith, said wrench selector comprising:

a flat, thin, wide, and elongated slide scale, said slide scale including a first end having a first jaw extending laterally therefrom, a first face and an opposite second face each having a plurality of fastener size numbers disposed essentially diagonally thereacross to form a plurality of vertical columns and a plurality of diagonal rows of fastener size numbers thereon, with each of said first face numbers corresponding to a standard fastener fractional inch and inch size and each of said second face numbers corresponding to a standard fastener metric size, and;

a flat, thin, and wide body sleeve including a slot extending therethrough adapted to fit closely about said slide scale, said sleeve having a first end with a second jaw extending therefrom and opposite said first jaw of said slide scale, a first face and an opposite second face each having a plurality of windows therethrough in a lateral array, with each of said windows being aligned with a corresponding one of said fastener size number vertical columns when said slide is placed within said body sleeve slot, whereby;

said first jaw and said second jaw are closed about each side of a fastener placed therebetween by sliding said slide scale within said body sleeve slot, and the size of the fastener is read within the single one of said windows having an exact alignment with a corresponding single one of said fastener size numbers on one said wrench selector face, thereby providing an unambiguous readout of the fastener size and the corresponding wrench size required.

13. The wrench selector of claim 12, wherein:

each of said fastener size numbers disposed upon each said face of said scale includes a lateral fastener size number reference mark disposed at least to each side thereof, and each said face of said body sleeve includes a window reference line laterally disposed across said sleeve and centered across said lateral array of windows, with the precise alignment of one said window reference line with a single one of said lateral fastener size number reference marks providing an exact indication of the size of a fastener placed closely between said first jaw and said second jaw.

14. The wrench selector of claim 12, including:

slide actuating and scale retaining means, comprising a closed end scale retaining slot formed through each said face of said body sleeve and parallel to said slide scale slot, and a slide button extending from each said face of said slide scale and through a corresponding one said scale retaining slot and captured therein, with said slide scale precluded from separation from said body sleeve by means of each said slide button engaging a corresponding one said closed end of said scale retaining slot to limit slide scale movement therethrough.

15. The wrench selector of claim 12, wherein:

said body sleeve is formed of a first face, an opposite second face spaced apart therefrom, a first lateral spacer, and an opposite second lateral spacer spaced apart from said first lateral spacer, with each said spacer being sandwiched between each said face, and with said slide scale slot being defined by said spaced apart first face and second face and said spaced apart first and second lateral spacer.

16. The wrench selector of claim 12, wherein:

said slide scale and said body sleeve are each formed having a generally rectangular configuration, with each said jaw, said slide scale, and said body sleeve each having smoothly rounded corners thereon.

17. The wrench selector of claim 12, wherein:

said fastener size numbers disposed upon each said slide scale face are each spaced downwardly from said first jaw a dimensional distance corresponding to each of said numbers.

18. The wrench selector of claim 12, wherein:

each said slide scale face includes five said vertical columns of said fastener size numbers, and each said body sleeve face includes five windows disposed laterally thereacross, with each of said windows being aligned with a corresponding one of said vertical columns of fastener size numbers when said slide scale is slidingly placed within said slide scale slot of said body sleeve.

19. The wrench selector of claim 12, wherein: said wrench selector has a maximum width of three inches and a maximum height of five inches and is adapted to fit within a conventional shirt pocket.

20. The wrench selector of claim 12, wherein: said wrench selector is formed of materials selected from the group consisting of stainless steel and aluminum metals, plastic, and stiff coated paper.

* * * * *